US012462936B2

(12) United States Patent
Arai et al.

(10) Patent No.: US 12,462,936 B2
(45) Date of Patent: *Nov. 4, 2025

(54) OBTAINING HEALTH DATA FROM A HEALTH KIOSK INFORMATION SYSTEM AND NOTIFYING USERS ACCORDING TO PRE-REGISTERED NOTIFICATION RULES

(71) Applicants: Shohei Arai, Tokyo (JP); Shun Tanaka, Parsippany, NJ (US); Jayasimha Nuggehalli, Cupertino, CA (US); Kaoru Watanabe, Sunnyvale, CA (US)

(72) Inventors: Shohei Arai, Tokyo (JP); Shun Tanaka, Parsippany, NJ (US); Jayasimha Nuggehalli, Cupertino, CA (US); Kaoru Watanabe, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 563 days.

This patent is subject to a terminal disclaimer.

(21) Appl. No.: 17/682,676

(22) Filed: Feb. 28, 2022

(65) Prior Publication Data

US 2023/0274831 A1    Aug. 31, 2023

(51) Int. Cl.
*G16H 50/20* (2018.01)
*A61B 5/01* (2006.01)
(Continued)

(52) U.S. Cl.
CPC ............... *G16H 50/20* (2018.01); *A61B 5/01* (2013.01); *G06F 3/048* (2013.01); *G16H 10/60* (2018.01); *G16H 40/40* (2018.01); *G16H 50/80* (2018.01)

(58) Field of Classification Search
CPC ........ G16H 50/20; G16H 10/60; G16H 40/40; G16H 50/80; G16H 40/67; A61B 5/01; G06F 3/048
See application file for complete search history.

(56) References Cited

U.S. PATENT DOCUMENTS 8,462,994 B2    6/2013  Ortiz et al.
8,844,811 B1    9/2014  Rogers et al.
(Continued)

FOREIGN PATENT DOCUMENTS

JP    2010128976 A  *  6/2010

OTHER PUBLICATIONS

JP2010128976A English Machine Translation (Year: 2010).*

(Continued)

*Primary Examiner* — Mamon Obeid
*Assistant Examiner* — Malak M Nasser
(74) *Attorney, Agent, or Firm* — Hickman Becker Bingham Ledesma LLP

(57) ABSTRACT

Techniques for obtaining health data from a health kiosk information system and notifying users according to pre-registered notification rules are provided. In one technique, a computing system (1) receives, over one or more computer networks, from a health kiosk information system, healthcare data including at least a healthcare value that is obtained by one or more health kiosks that are managed by the health kiosk information system, the health kiosk information system being distinct from the computing system; (2) reads, from a memory, notification rule data including a condition to be notified and a notification destination, the condition corresponding to the healthcare value; (3) determines whether the healthcare value that is included in the healthcare data is applicable to the condition included in the notification rule data; and (4) in response to determining that (Continued)

the healthcare value is applicable, sends a notification to the notification destination.

20 Claims, 11 Drawing Sheets

(51) Int. Cl.
  *G06F 3/048* (2013.01)
  *G16H 10/60* (2018.01)
  *G16H 40/40* (2018.01)
  *G16H 40/67* (2018.01)
  *G16H 50/80* (2018.01)

(56) References Cited

U.S. PATENT DOCUMENTS

| | | | |
|---|---|---|---|
| 8,919,645 B1 | 12/2014 | Jones et al. | |
| 9,076,273 B2 | 7/2015 | Smith | |
| 9,479,339 B2 | 10/2016 | Bender et al. | |
| 9,483,631 B2 | 11/2016 | Lowe | |
| 9,508,207 B2 | 11/2016 | Kalb et al. | |
| 9,548,982 B1 | 1/2017 | Karunakaran et al. | |
| 9,554,279 B1 | 1/2017 | Kremer et al. | |
| 9,640,002 B1 | 5/2017 | Grosberg | |
| 9,875,590 B2 | 1/2018 | Schmidt-Lackner et al. | |
| 9,972,144 B2 | 5/2018 | Klein et al. | |
| 10,665,047 B1 | 5/2020 | Terp | |
| 10,665,348 B1* | 5/2020 | Krayer | G16H 50/30 |
| 10,923,216 B1 | 2/2021 | White et al. | |
| 11,011,003 B1 | 5/2021 | Jafri et al. | |
| 11,263,850 B2 | 3/2022 | Jafri | |
| 11,398,122 B2 | 7/2022 | Terp | |
| 11,574,514 B2 | 2/2023 | Luthra | |
| 11,783,658 B2* | 10/2023 | Chaurasia | G16H 50/30 |
| | | | 340/5.2 |
| 11,935,349 B2 | 3/2024 | Lin | |
| 2009/0153291 A1 | 6/2009 | Larson et al. | |
| 2010/0222645 A1* | 9/2010 | Nadler | A61B 5/0022 |
| | | | 600/300 |
| 2014/0282897 A1 | 9/2014 | Stuntebeck | |
| 2014/0343975 A1 | 11/2014 | Nanjo | |
| 2015/0007619 A1 | 1/2015 | Finney et al. | |
| 2019/0252060 A1* | 8/2019 | Randhawa | G16H 40/67 |
| 2019/0278986 A1 | 9/2019 | Nepomniachtchi | |
| 2019/0287033 A1 | 9/2019 | Hashimoto | |
| 2020/0082919 A1* | 3/2020 | Fish | G16H 10/65 |
| 2020/0089979 A1 | 3/2020 | Garcia Rodriguez | |
| 2020/0342699 A1 | 10/2020 | Lingan | |
| 2021/0011988 A1 | 1/2021 | Tonnoir | |
| 2021/0065069 A1 | 3/2021 | Yuluguri | |
| 2021/0128979 A1 | 5/2021 | McHugh | |
| 2021/0304537 A1* | 9/2021 | Reed | G06F 18/22 |
| 2021/0327181 A1 | 10/2021 | Klein et al. | |
| 2021/0327189 A1 | 10/2021 | Jarvis et al. | |
| 2021/0327548 A1 | 10/2021 | Sparks et al. | |
| 2021/0335073 A1 | 10/2021 | Luker | |
| 2021/0350649 A1 | 11/2021 | Jafri | |
| 2021/0391041 A1 | 12/2021 | White et al. | |
| 2022/0036678 A1* | 2/2022 | Parekh | G06V 40/107 |
| 2022/0167154 A1 | 5/2022 | Ejiri et al. | |
| 2022/0301667 A1 | 9/2022 | Church et al. | |
| 2023/0135861 A1 | 5/2023 | Lin et al. | |
| 2023/0153426 A1* | 5/2023 | Grobelny | G06F 21/602 |
| | | | 726/22 |
| 2023/0162546 A1 | 5/2023 | O'Toole et al. | |

OTHER PUBLICATIONS

Lin, U.S. Appl. No. 17/515,023, filed Oct. 29, 2021, Notice of Allowance and Fees Due, Nov. 15, 2023.

Lin, U.S. Appl. No. 17/515,023, filed Oct. 29, 2021, Non-Final Rejection, Jun. 22, 2023.

* cited by examiner

OBTAINING HEALTH DATA FROM A HEALTH KIOSK INFORMATION SYSTEM AND NOTIFYING USERS ACCORDING TO PRE-REGISTERED NOTIFICATION RULES

CROSS-REFERENCE TO RELATED APPLICATIONS

This application is related to U.S. patent application Ser. No. 17/198,136, filed Mar. 10, 2021, the entire contents of which are hereby incorporated by reference as if fully set forth herein.

TECHNICAL FIELD

The present disclosure relates to a health data processing system and, more particularly to, obtaining health data from a health kiosk information system and notifying users according to pre-registered notification rules.

BACKGROUND

For many kinds of organizations, such as businesses, governments, and academic institutions, it is important to gather at a dedicated location (e.g., a "workplace" or school) in order to conduct activities of the organization. However, it can be difficult to maintain social distancing and other health-based safety practices while in a defined physical area. It is even more difficult for administrators and human resources departments to enforce health-based safety practices in defined physical areas, such as a workplace or school.

One approach is for all people who wish to gain access to certain buildings, rooms, etc. (referred to herein as physical areas) to travel to certain designated areas where one or more checks are performed, such as checking a vaccination card and performing a body temperature test. For example, a person with a temperature within a certain range is granted access to a physical area by the person administering the temperature test. However, this approach is a significant administrative burden that increases the costs of running an enterprise. Also, this approach requires people to administer the checks near the entrance of each physical area when there may be many physical areas to which a person might need access. Furthermore, if a person needs access to one or more of the physical areas on a daily basis, then these checks need to be performed manually on a daily basis.

In one approach, a health kiosk is setup near an entrance to a protected physical area in order to automatically check health conditions of visitors (such as body temperature) before the protected physical area is made accessible to a visitor. However, current health kiosks do not provide mechanisms for notifying other users, such as facility managers, of these conditions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for obtaining health data from a health kiosk information system and notifying users according to pre-registered notification rules are described. In one technique, a cloud system receives, over a computer network, healthcare data from a health kiosk information system. The healthcare data includes a healthcare value that is obtained by one or more health kiosks that are managed by the health kiosk information system, which is distinct from the cloud system. After receiving the healthcare data, the cloud system reads, from a memory, notification rule data that includes a condition to be notified and a notification destination. The condition corresponds to the healthcare value. The cloud system determines whether the healthcare value is applicable to the condition included in the notification rule data. In response to determining that the healthcare value is applicable to the condition, the cloud system sends, over the one or more computer networks, a notification to the notification destination that is indicated in the notification rule data.

Embodiments improve computer technology; specifically, health kiosk information system technology by allowing users or administrators affiliated with health kiosks to create notification rules that, when triggered based on healthcare data received from a health kiosk, cause one or more notifications to be transmitted to one or more intended recipients. Integrating a health kiosk information system with a notification rule generation system improves the utility of both health kiosks and physical area access management systems.

System Overview

Figure 1:
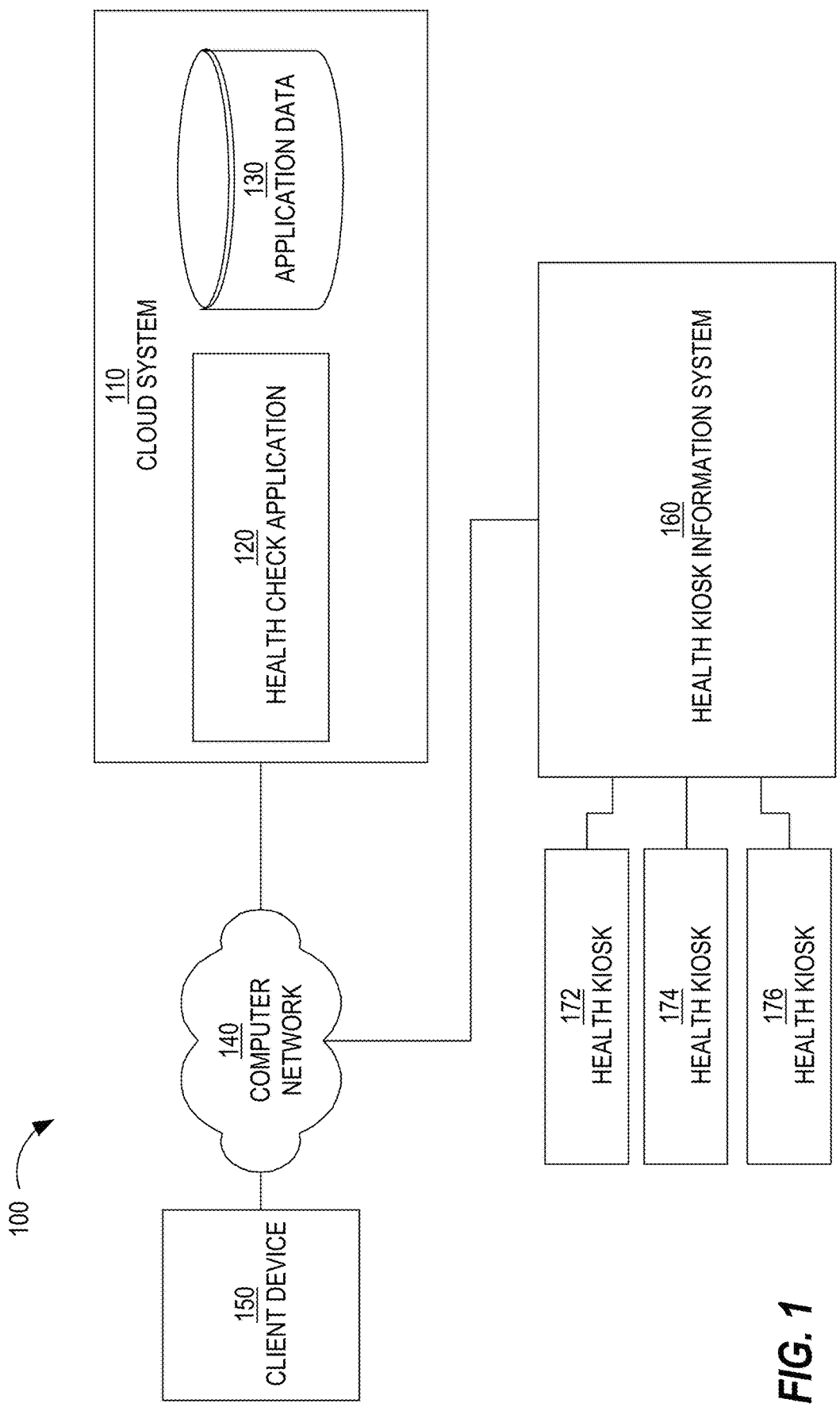
FIG. 1 is a block diagram that depicts a system architecture for obtaining health data from a health kiosk information system and notifying users according to pre-registered notification rules, in an embodiment.

FIG. 1 is a block diagram that depicts a system architecture 100 for obtaining health data from a health kiosk information system and notifying users according to pre-registered notification rules, in an embodiment. System architecture 100 comprises a cloud system 110, a computer network 140, a client device 150, a health kiosk information system 160, and health kiosks 170-174. Although three health kiosks are depicted in FIG. 1, health kiosk information system 160 may be communicatively coupled to more or fewer health kiosks. Cloud system 110 may be operated by a first entity while health kiosk information system 160 and health kiosks 170-174 may be operated by one or more second entities that are different than (or do not include) the first entity.

Cloud system 110 may be implemented by one or more computing devices. Cloud system 110 includes or hosts a health check application 120 and application data 130.

Computer network 140 may be a local area network, a wide area network, or a packet-switched network, such as the Internet.

Examples of client device 150 include, without limitation, a smartphone, a laptop computer, a desktop computer, a tablet computer, workstation, personal digital assistants (PDAs), cellular telephony devices, and any type of mobile devices. Client device 150 is connected to computer network 140 to allow client device 150 to send and receive data, over that network connection, to other computing devices.

Health kiosk information system 160 is communicatively coupled to health kiosks 170-174. Health kiosk information system 160 remotely manages health kiosks 170-174 and stores healthcare data, such as body temperature or mask detection, that is measured (or detected) by each of health kiosks 170-174. Health kiosk information system 160 may be communicatively coupled to health kiosks 170-174 over one or more computer networks that may or may not include computer network 140.

Health kiosks 170-174 may be geographically distributed. Each of health kiosks 170-174 may be located, for example, at an entrance of different buildings. Each of health kiosks 170-174 includes one or more health condition measurement devices for measuring one or more health-related conditions, such as body temperature, blood pressure, blood oxygen level, for each person who attempts to enter a physical area, such as a building or a specific room.

A health kiosk may also include a digital image capturing device (or digital camera) that takes one or more digital images of a person. The health kiosk (or HKIS 160 to which the health kiosk sends the digital images) may include software and hardware for analyzing digital images and making one or more determinations, such as whether a person whose image is digitally captured in a digital image is wearing a mask that sufficiently covers the mouth and nose of the person.

A health kiosk may also include a dispenser that is triggered based on input from a user. For example, the dispenser may be a sanitizer dispenser that dispenses a certain amount of sanitizer solution in response to input from a user who is physically located at the health kiosk. The input may be the placement of the user's hand in a certain location or the pressing of a particular physical (or graphical) button on the health kiosk. The health kiosk detects when it dispenses sanitizer or another item and may send confirmation of the sending to HKIS 160.

Cloud System

Figure 2:
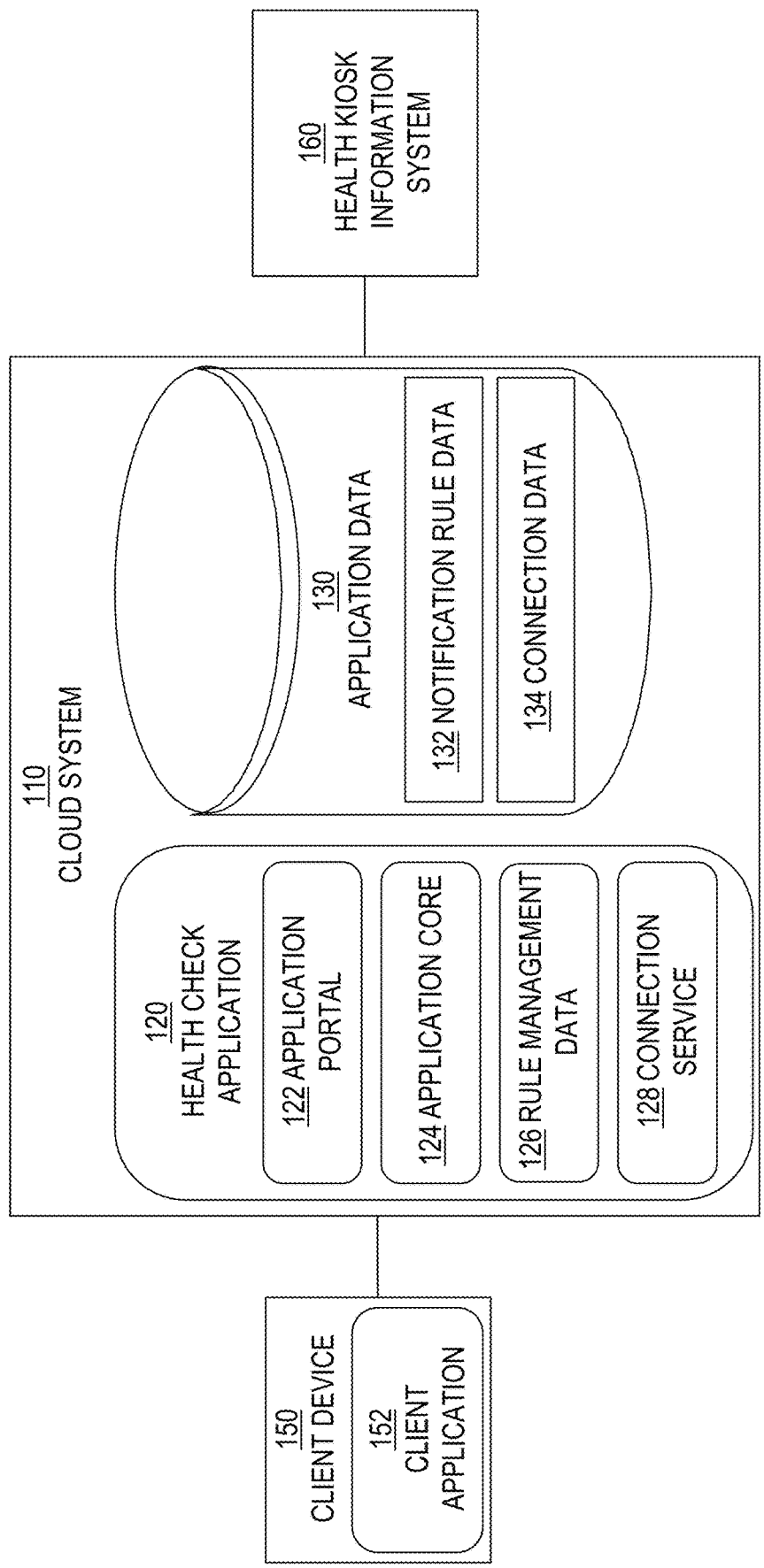
FIG. 2 is a block diagram that depicts sub-components of different components of the system architecture, in an embodiment.

FIG. 2 is a block diagram that depicts sub-components of different components of system architecture 100, in an embodiment.

HCA 120 obtains healthcare information from health kiosk information system (HKIS) 160 and generates an electronic notification if the obtained healthcare information is applicable to a condition associated with a pre-configured rule. HCA 120 comprises multiple functions, examples include an application portal 122, an application core 124, a rule data management 126, and a communication service 128. Each of application portal 122, application core 124, rule data management 126, and communication service 128 is implemented in software, hardware, or a combination of software and hardware. Health check application (HCA) 120 may be a web-based application.

Application portal 122 causes a portal of HCA 120 to be presented on a screen of client device 150. For example, in response to receiving a hypertext transport protocol (HTTP) request from a web browser executing on client device 150, application portal 122 sends, to client device 150, web content data for presenting a rule generating user interface on client device 150. In response to receiving, through the rule generating user interface, input that specifies a condition, application portal 122 sends the condition to rule data management 126.

Rule data management (RDM) 126 manages notification rule data. For example, RDM 126 generates notification rule data based on the condition input received via the rule generating user interface that was presented on client device 150 and stores the generated notification rule data on a memory of cloud system 110 (or external storage).

Communication service 128 manages data communication for HKIS 160. For example, communication service 128 obtains healthcare information from HKIS 160 by calling a web-API of HKIS 160.

Client device 150 includes a client application 152 that is configured to communicate with HCA 120 over computer network 140, such as sending elements of one or more notification rules to HCA 120 and displaying a user interface based on data received from HCA 120. Client application 152 may be (a) a native application that is installed on client device 150 or (b) web application that executes within a web browser that is installed on client device 150.

Application data 130 includes notification rule data 132 and connection data 134, both of which may originate (or be composed) at client device 150. Notification rule data 132 may indicate one or more rules for notifying one or more users based on one or more conditions being satisfied, as described in more detail herein. Connection data 134 include data for establishing a connection with HKIS 160, as described in more detail herein.

Process Overview

Figure 3A:
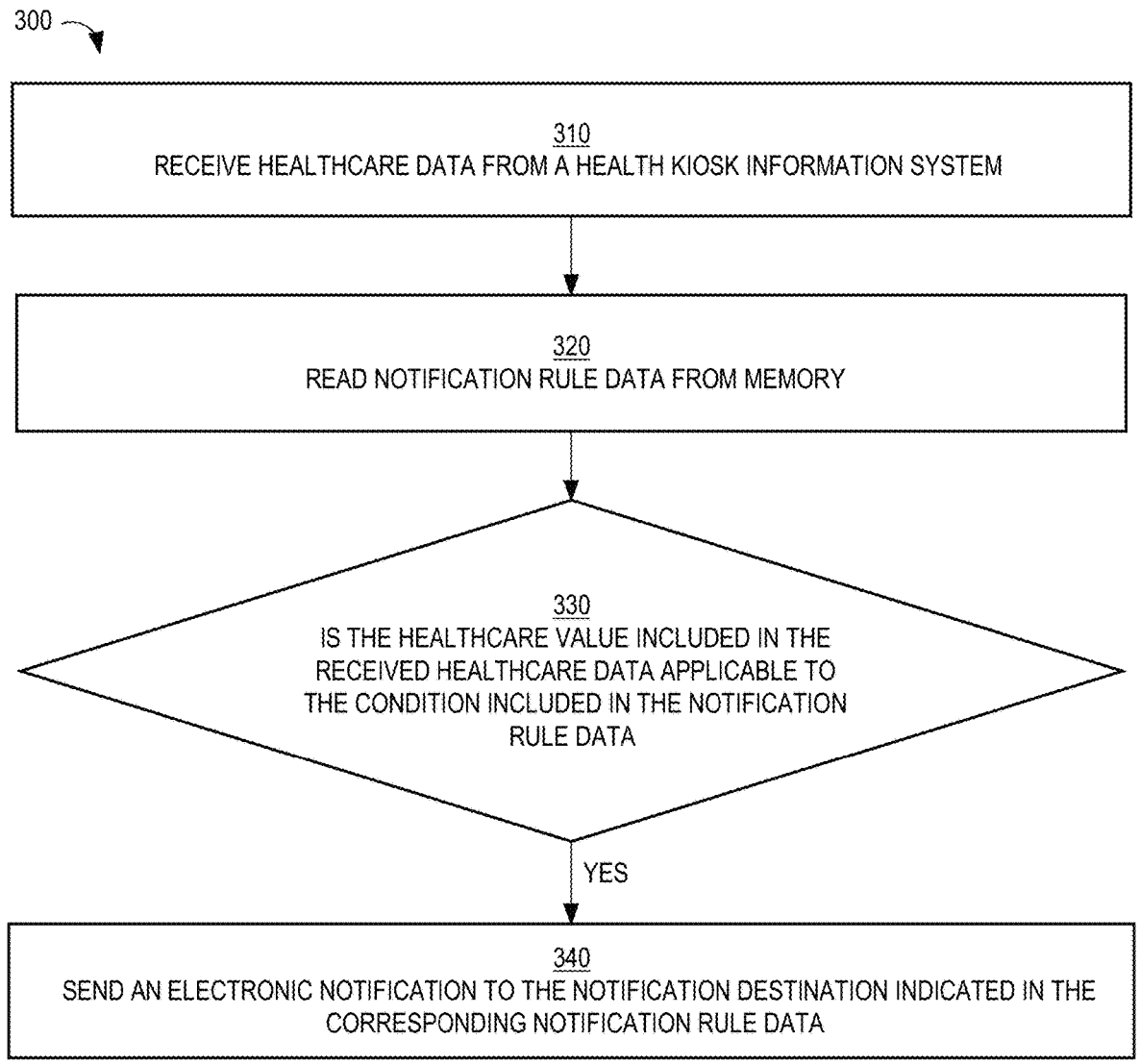
FIG. 3A is a flow diagram that depicts an example process for processing healthcare information pertaining to an individual, in an embodiment.

FIG. 3A is a flow diagram that depicts an example process 300 for processing healthcare information pertaining to an individual, in an embodiment. Process 300 may be implemented by HCA 120 or, more specifically, one or more components of HCA 120, such as communication service 128 and application core 124.

At block 310, HCA 120 receives healthcare data from HKIS 160. For example, communication service 128 sends, to HKIS 160 via one or more computer networks (e.g., computer network 140) and via an application programing interface (API) of HKIS 160, a request to obtain healthcare data. The request may include connection information, such as an API key that is issued by HKIS 160 to verify the authenticity of HCA 120. In response, communication service 128 receives the healthcare data.

Alternatively, communication service 128 receives the healthcare data without sending any request to HKIS 160. For example, communication service 128 receives the healthcare data via the one or more computer networks and via an API of HCA 120. In this example, a manger or a developer of HKIS 160 registered information relating to the API of HCA 120 in advance.

The healthcare data includes a healthcare value obtained from each of one or more individuals (people) by each of health kiosks 170-174, which are communicatively coupled to HKIS 160. The healthcare value includes, for example, body temperature, mask detection, and sanitizer detection. Mask detection indicates whether an individual wears a mask while sanitizer detection indicates whether an individual uses a sanitizer of health kiosk. The healthcare data may also include user information (indicating first name, last name, and/or a user identifier), time information (indicating a time when the healthcare value was obtained by a health kiosk), and device information (indicating one or more attributes of the health kiosk that obtained the healthcare value, such as an IP address, a kiosk name, a location of the health kiosk, and an operation status of the health kiosk).

The following table includes a description of different data items within (e.g., a single message of) healthcare data that may be received from HKIS 160:

TABLE A

| Healthcare Item | Description | Examples |
| --- | --- | --- |
| User ID | User ID registered in HKIS | User0001, User0002 |
| Kiosk ID | Identifies health kiosk that obtained data | A00001, A00002 |
| Time at Kiosk | Time when healthcare data is obtained by health kiosk | 2022-02-17 08:25:31 |
| Data Type: Temperature | Body temperature | 95.8 |
| Data Type: Mask Detection | Whether person wears a mask | Yes, No, Unknown |
| Data Type: Sanitizer Detection | Whether person used sanitizer located on health kiosk | Yes, No, Unknown |

A message from HKIS 160 may include a single data type condition or multiple data type conditions. For example, a message from HKIS 160 may include a body temperature value and a mask detection value pertaining to a single person.

At block 320, HCA 120 reads notification rule data from memory. The memory may be implemented in cloud system 110 or in an external storage service, such as GDrive or Box. The notification rule data includes a notification destination and a condition corresponding to the healthcare value. In a scenario where the condition is based on body temperature, a threshold body temperature is set as the condition. A user is able to set and modify the condition and the notification destination. The notification destination may include, for example, an email address or phone number of a manager.

At block 330, HCA 120 determines whether the healthcare value included in the received healthcare data is applicable to the condition included in the notification rule data. For example, if 99.5 F is set as a threshold body temperature for a condition and the actual body temperature indicated in healthcare data received from HKIS 160 is 99.8 F, then application core 124 determines that the healthcare value is applicable to (or satisfies) the condition.

If the notification rule data comprises multiple notification rules, then block 330 may comprise reading multiple notification rules in order to identify a notification rule that pertains to healthcare data received from HKIS 160. For example, if an instance of healthcare data (e.g., pertaining to a single person) includes a body temperature value and there are multiple rules pertaining to body temperature, then HCA 120 reads and analyzes only notification rules within the notification rule data that pertain to body temperature. As another example, if an instance of healthcare data includes a mask detection value and a sanitizer detection value, then HCA 120 reads and analyzes only notification rules pertaining to mask detection and sanitizer detection.

At block 340, in response to the determination that the healthcare value is applicable to the condition, HCA 120 sends an electronic notification to the notification destination indicated in the corresponding notification rule data. The notification may include, for example, without limitation, an email, a text message (e.g., a Short Message Service (SMS) message) or a push notification for a smart device. Push notification includes, for example, APNs (Apple Push Notification Service) for iOS and FCM (Firebase Cloud Messaging) for Android OS.

Figure 3B:
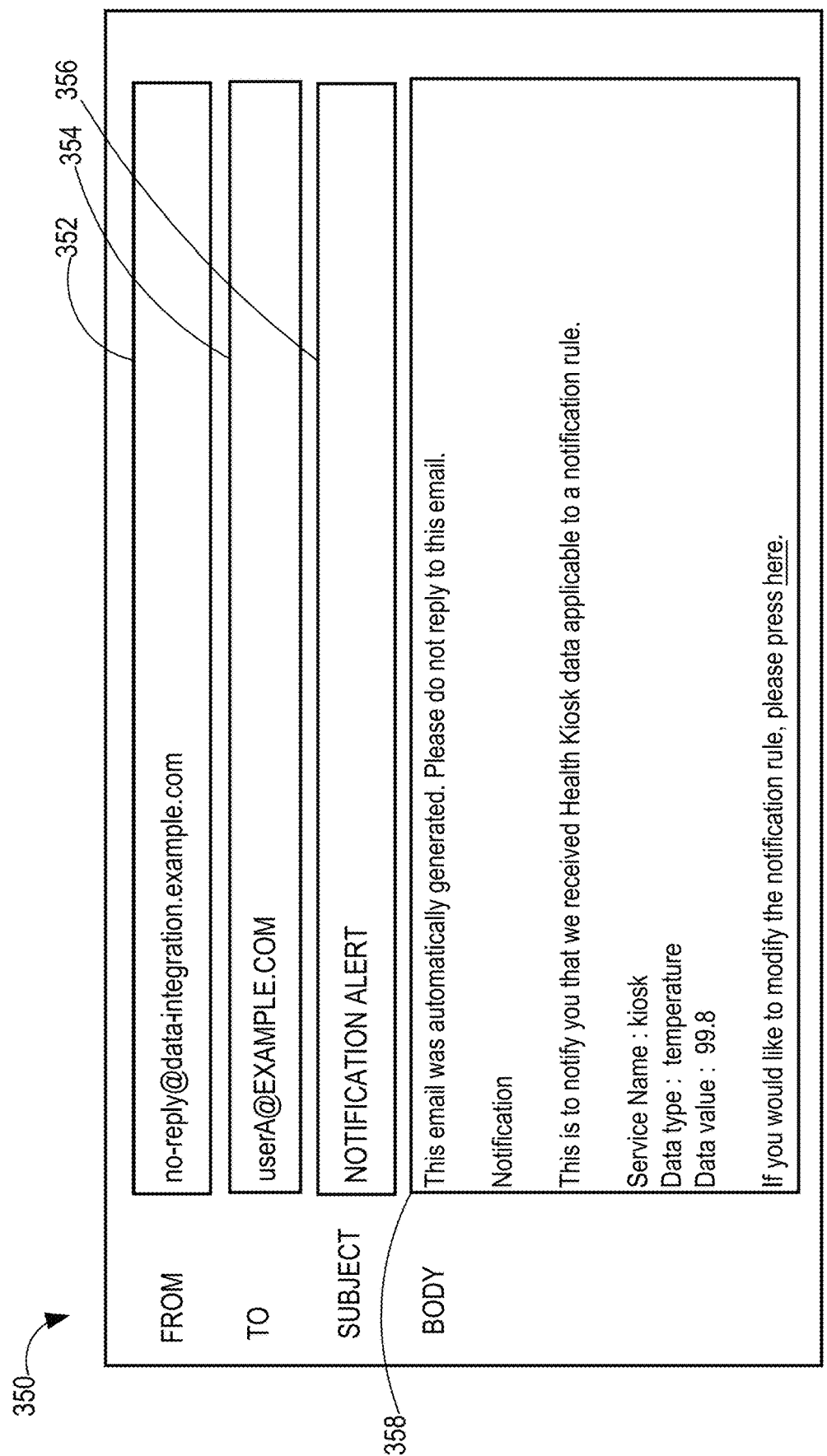
FIG. 3B is a block diagram that depicts an example email notification that is generated automatically in response to determining that a condition of a notification rule is satisfied, in an embodiment.

FIG. 3B is a block diagram that depicts an example email notification 350 that is generated automatically in response to determining that a condition of a notification rule is satisfied, in an embodiment. Email notification 350 includes: a From field 352 that indicates an email address of a sender of email notification 350; a To field 354 that indicates an email address of a target (or an intended recipient) of email notification 350; a Subject field 356 that indicates a subject of email notification 350; and a body field 358 that includes text describing details of the notification, such as attribute names and values of the notification rule whose condition was satisfied.

Figure 3C:
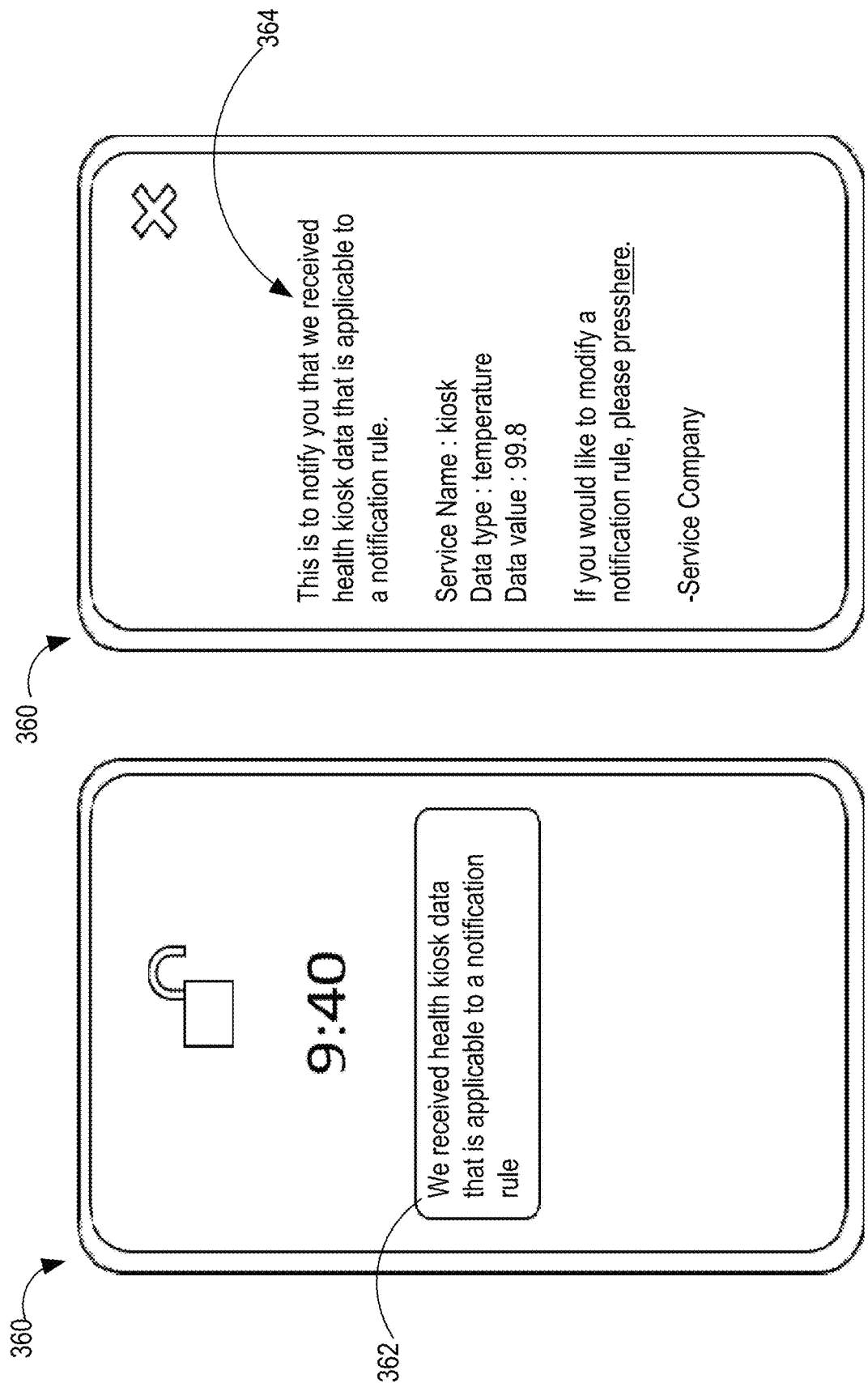
FIG. 3C is a block diagram that depicts examples of a smartphone notification that may be generated automatically in response to determining that a condition of a notification rule is satisfied, in an embodiment.

FIG. 3C is a block diagram that depicts examples of a smartphone notification that may be generated automatically in response to determining that a condition of a notification rule is satisfied, in an embodiment. Smartphone notification 362 is a push notification that may be presented on a screen of a mobile device 360, if notification settings of mobile device 360 (which may correspond to client device 150) allow for push notifications to be presented automatically, which settings may be application-specific. Smartphone notification 362 provides high level information of the notification rule whose condition was satisfied. User selection of smartphone notification 362 causes smartphone notification 364 to be presented, for example, within a particular application executing on mobile device 360. Smartphone notification 364 includes more information about the notification, such as a data type (temperature in this example), a data value corresponding to the data type (99.8 in this example), and a link to modify the notification rule that was triggered, causing smartphone notification 364 to be generated. In other embodiments, this information may be included in smartphone notification 362.

Additionally, a notification may be a real-time push notification or a "pull" notification where an end-user's input is required to view the notification. For example, without limitation, for non-emergency notifications, when the user (such as a system administrator or manager) opens client application 152, client application 152 presents the notification. In such an embodiment, in response to determining that a condition of a notification rule is satisfied, HCA 120 creates data. When the user opens client application 152, client application 152 may access to HCA 120 and refresh a display by presenting the notification on the display.

Process for Generating Rules

Figure 4A:
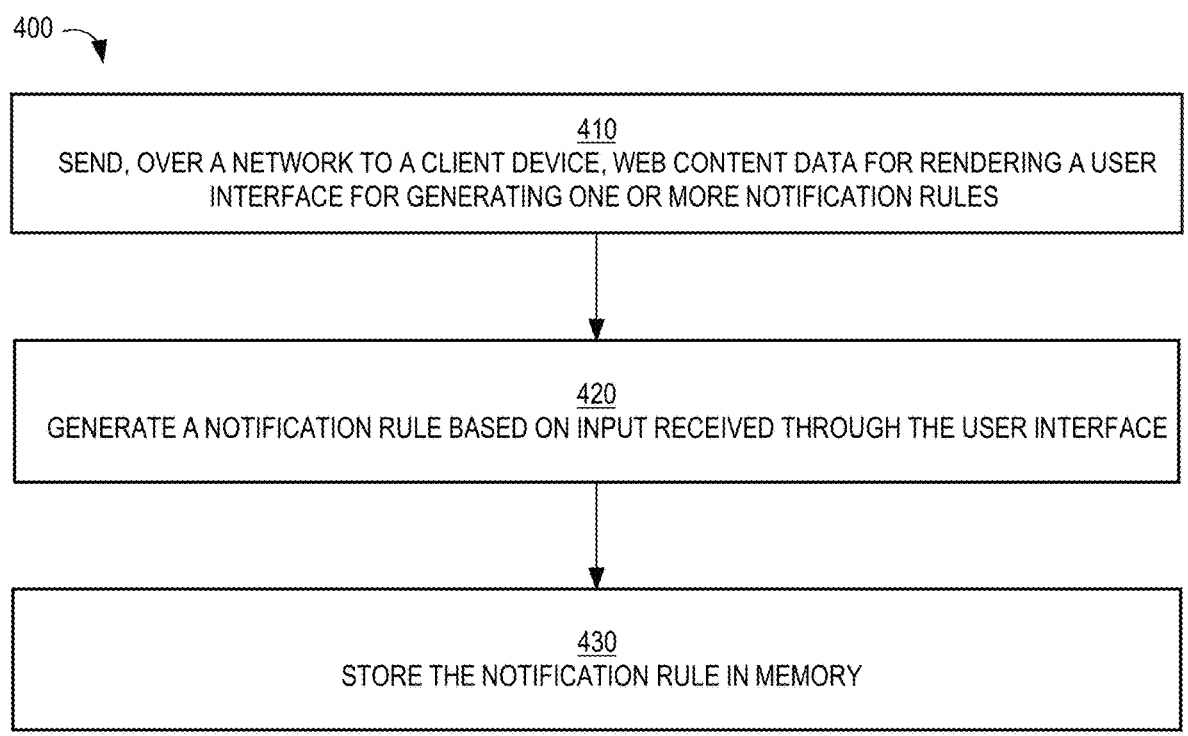
FIG. 4A is a flow diagram that depicts an example process for generating notification rule data, in an embodiment.

FIG. 4A is a flow diagram that depicts a process 400 for generating notification rule data, in an embodiment. Process 400 may be implemented by different components of HCA 120.

At block 410, HCA 120 (e.g., application portal 122) sends, to client device 150 via one or more computer networks (e.g., computer network 140), web content data that includes a user interface, when rendered on a screen of client device 150, to receive user input for generating one or more rules. The sending of web content data may be in response to a request from client device 150. The request may include, for example, an HTTP request. The web content data may be HTML, data that a web browser of client device 150 is able to process in order to render the user interface on the screen.

Figure 4B:
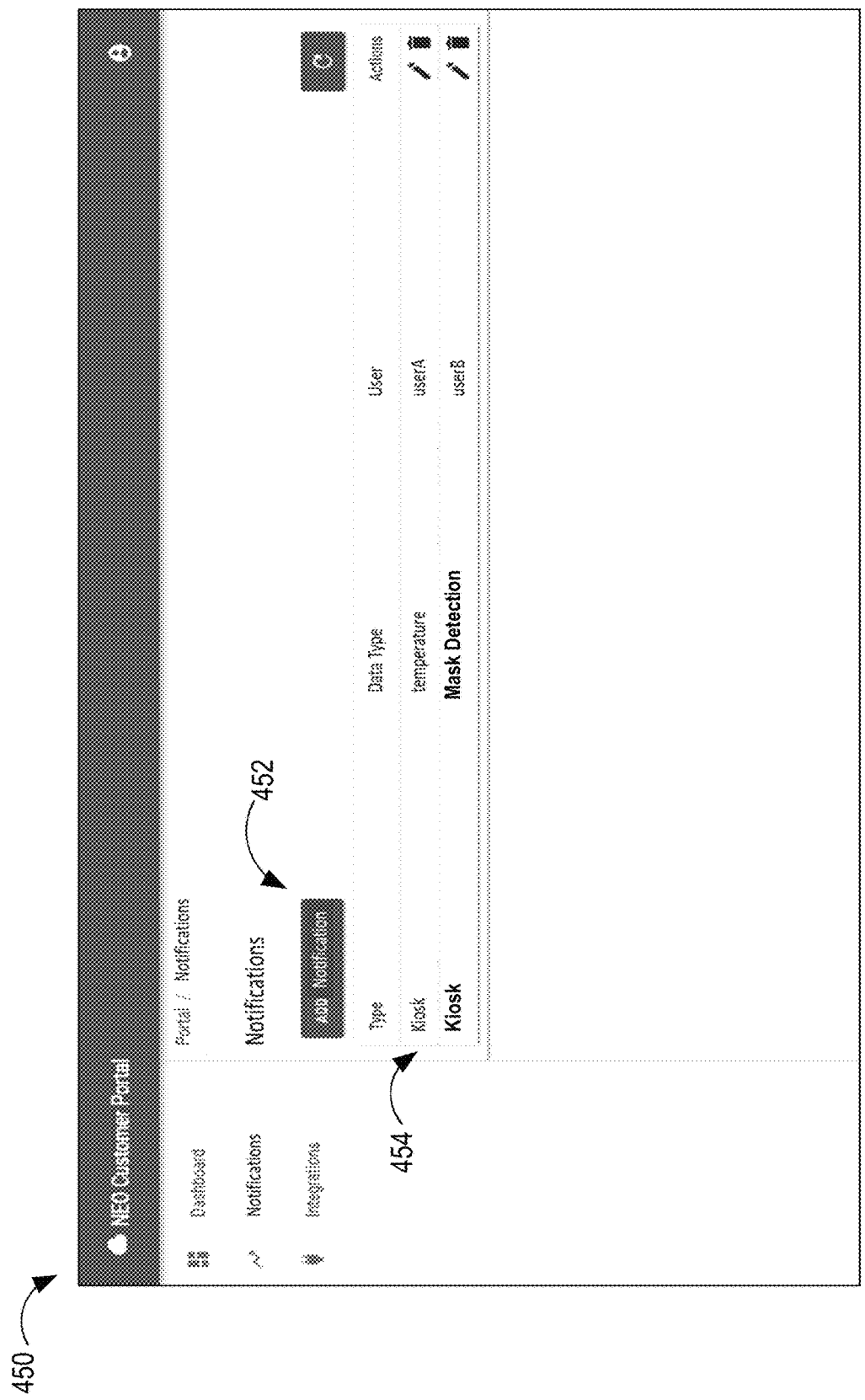
FIG. 4B is a screenshot of an example user interface for adding a notification rule, in an embodiment.

FIG. 4B is a screenshot of an example user interface 450 for adding a notification rule, in an embodiment. User interface 450 includes an "Add Notification" button 452 and a list 454 of current notification rules. In the depicted example, there is a single notification rule listed. User interface 450 includes information about each notification rule in list 454, including a type of system, a data type, a user, and an action that may be performed with respect to each notification. Possible actions include edit and delete. In the depicted example, the type of system is "Kiosk," the data type is "temperature," and the user is "userA."

Figure 4C:
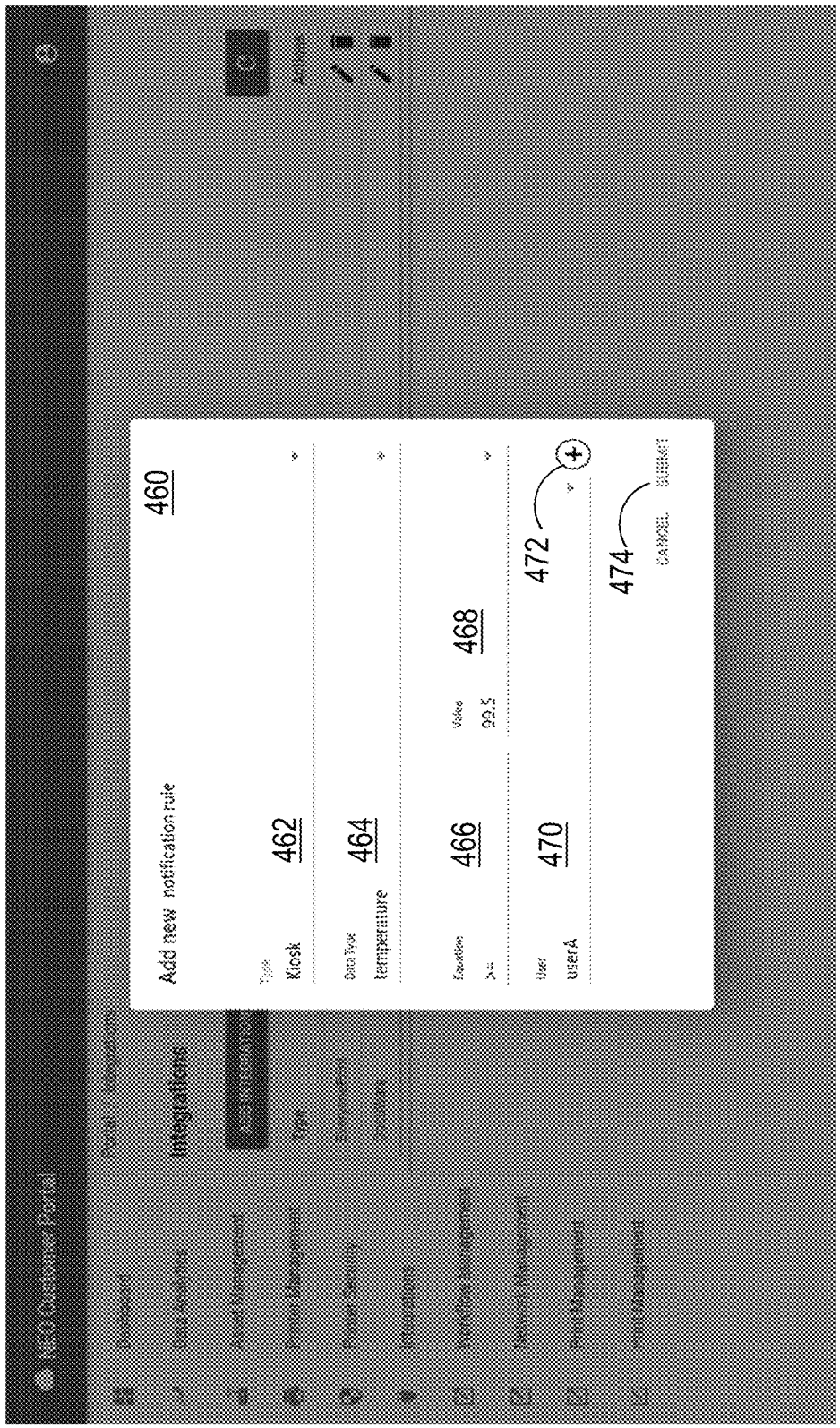
FIG. 4C is a screenshot of an example popup window that is generated and presented for inputting a new notification rule, in an embodiment.

FIG. 4C is a screenshot of an example popup window 460 that is generated and presented for inputting a new notification rule, in an embodiment. Popup window 460 may be presented (or displayed) in response to selection of "Add Notification" button 452. Popup window 460 includes fields for inputting data, such as a system type field 462, a data type field 464, an equation field 466, a value field 468, a user specification field 470, an add user button 472, and a submit button 474. Values in the system type field 462 may be used when kiosks are coupled to different HKISs. Different HKISs may be provided by another vender or the same vender. If there are multiple HKISs, then the values for system type field 462 may be Kiosks A, Kiosks B, and so forth. Examples of data types that may be input in data type field 464 include temperature, face mask detection, and sanitizer detection. Possible values for equation field 466 include =, !=, >, <, >=, <=. Possible values for value field 468 include numeric values, True, False, Yes, and No. A user specification is text that comprises a user identifier or a range of user identifiers. Add user button 472 is used to add additional user specifications, whether one or more single user identifiers or one or more ranges of user identifiers.

At block 420, HCA 120 (e.g., rule data management 126) generates notification rule data based on user input that is received through the user interface. The user input may include, for example, input of a threshold health care value and input of a notification destination.

The following table lists examples of notification rules that may be generated (and eventually stored) using user interface 450 and popup window 460:

TABLE B

| Rule ID | Condition | Equation | Value | Destination | Target User |
|---|---|---|---|---|---|
| Rule1 | Temperature | >= | 99.5 | jim@ . . . | User0*, User1*, User2* |
| Rule2 | Mask Detection | = | No | danny@ . . . | User00* |
| Rule3 | Temperature | >= | 99.0 | Mary@ . . . | User5*, user6* |

The '*' indicates a wildcard. For example, "User0*" includes all of users between User0000 and User0999. As another example, "User00*" includes all users between User0000 and User0099. As another example, "User5*" includes all users between User5000 and User5999.

At block 430, HCA 120 (e.g., rule data management 126) stores the generated notification rule data in a memory. The memory may be volatile or non-volatile memory. The memory may be implemented in cloud system 110 or in an external storage service.

In an embodiment, a notification rule is specific to a particular kiosk, but not all kiosks. For example, even if multiple kiosks are coupled to same HKIS 160, one notification rule for mask detection may specify a first kiosk that is located inside of a building. In this embodiment, the user creating the notification rule may choose not to receive a notification from a second kiosk that is different than the first kiosk.

Connection Setup with a Health Kiosk Information System

Figure 5A:
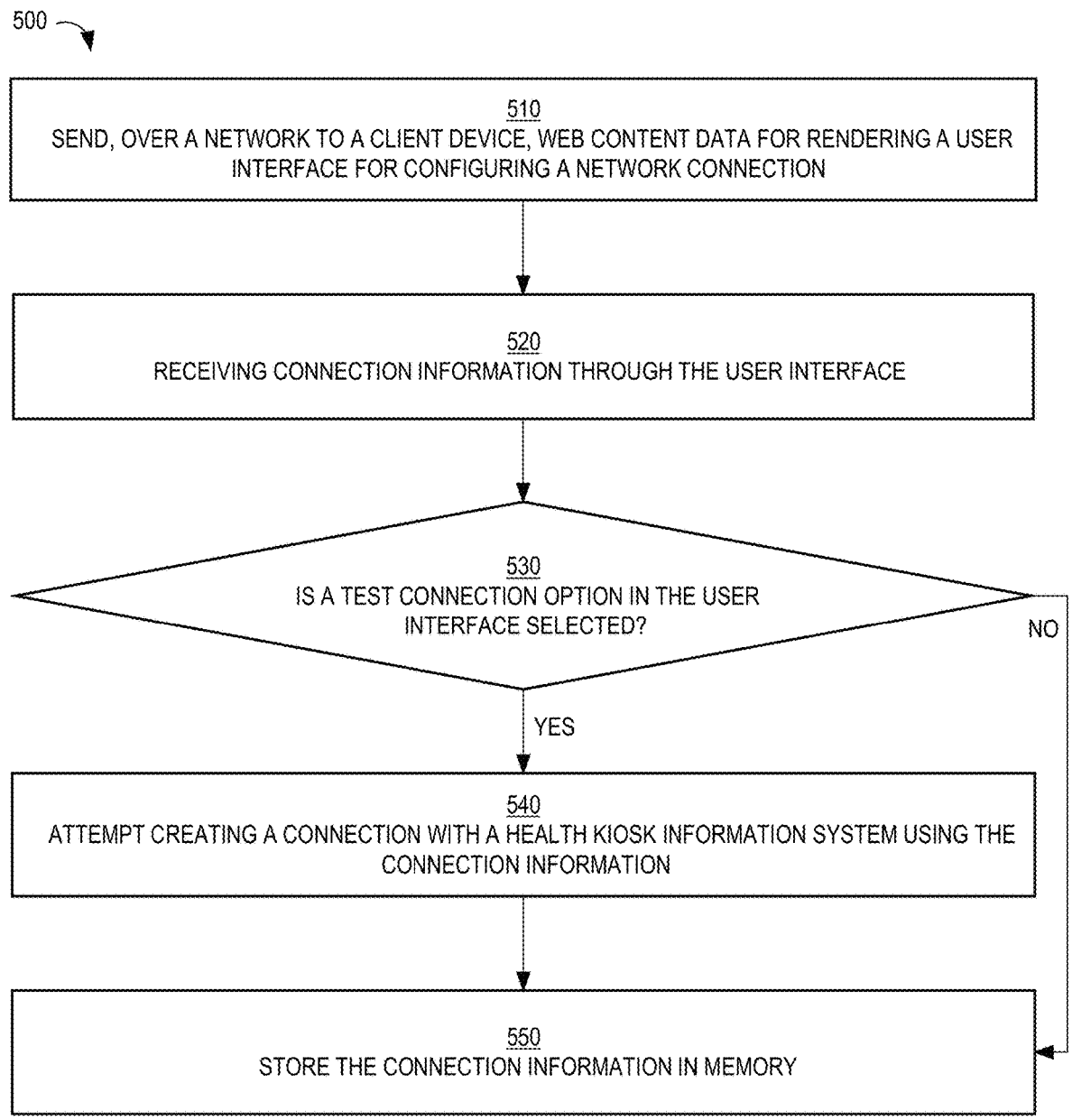
FIG. 5A is a flow diagram that depicts an example process for establishing connection information to connect a cloud system with the health kiosk information system, in an embodiment.

FIG. 5A is a flow diagram that depicts an example process 500 for connecting to a new HKIS or for adding another HKIS, in an embodiment. Process 500 may be implemented by one or more components of HCA 120.

At block 510, HCA 120 (e.g., application portal 122) sends, to client device 150 via one or more computer networks (e.g., computer network 140), web content data that includes a user interface, when rendered on a screen of client device 150, to receive user input comprising connection information in order to configure or establish a network connection. The sending of the web content data may be in response to a request from client device 150. The request may include, for example, an HTTP request. The web content data may be HTML data that a web browser of client device 150 is able to process in order to render the user interface on the screen.

The connection information is data to access HKIS 160. The data to access may include, for example, a host address of HKIS 160 and an API key that HKIS 160 previously issued. A user (such as a system administrator or manager) who initiates process 500 obtains the API key in advance.

Figure 5B:
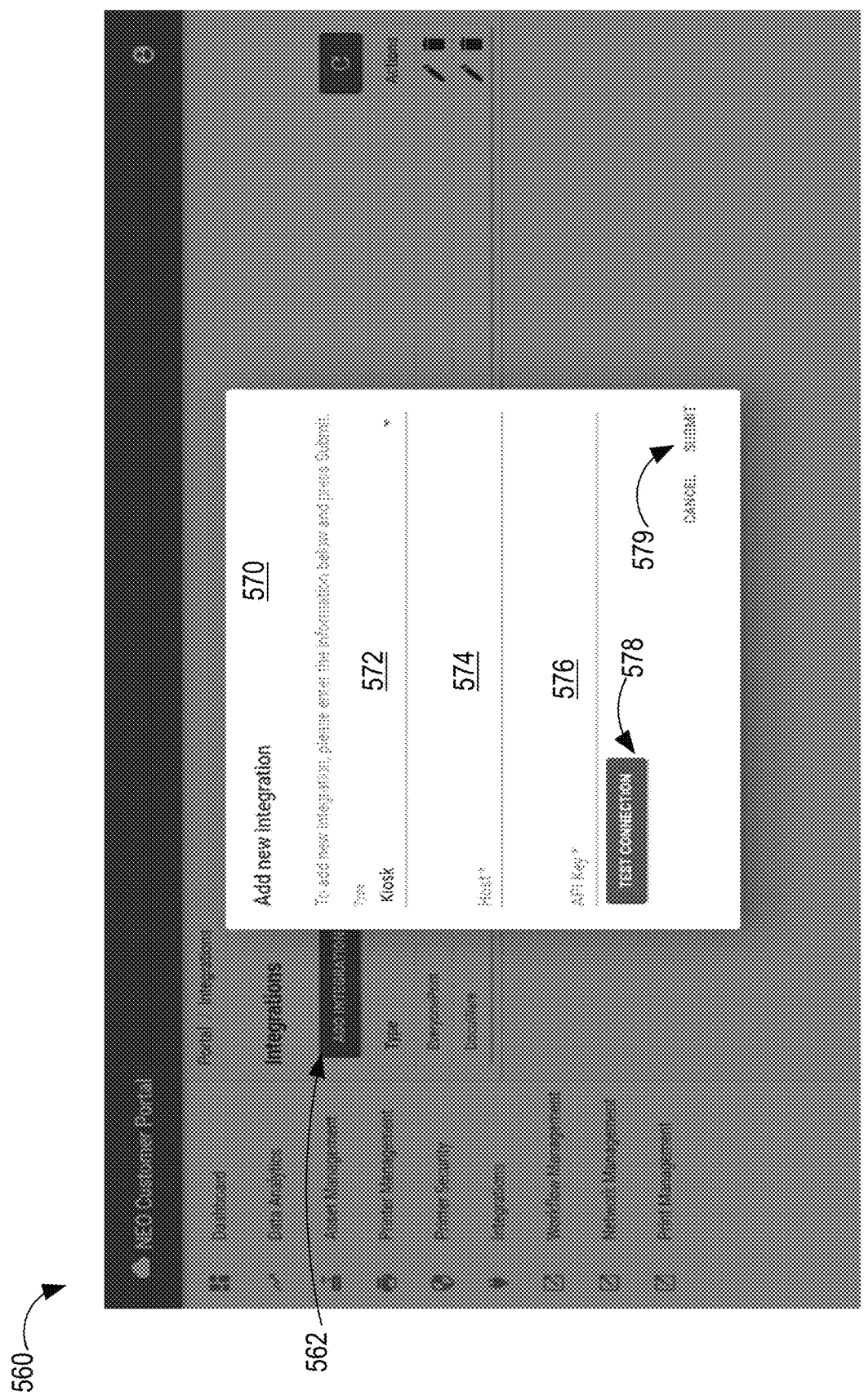
FIG. 5B is a screen shot of an example user interface for connecting to the health kiosk information system, in an embodiment.

FIG. 5B is a screen shot of an example user interface 560 for connecting to HKIS 160, in an embodiment. User interface 560 may be presented on a screen of client device 150 and includes an "Add Integration" button 562 that, when selected, causes popup window 570 to be presented on the screen, overlapping user interface 560. Popup window 570 includes three fields: a type field 572 indicating a type of system to integrate; a host field 574 indicating a host IP address; and an API key 576 indicating an API key that the integrated system (e.g., HKIS 160) will use to authenticate HCA 120. A user provides the appropriate input in each field and selects the "Test Connection" button 578, which causes a test connection message to be sent to the computer system associated with the host address. If the test connection is successfully established, then the user may select the "Submit" button 579, which causes the inputted data to be stored in memory, such as non-volatile storage that is accessible to HCA 120.

Although cloud system 110 accesses HKIS 160 via a web-API using a host name and an API key is described, alternatively, cloud system 110 may access HKIS 160 directly via a server or database. For example, the connection information may include a name of a server or database, a user ID, and/or a password.

At block 520, HCA 120 (e.g., application portal 122) receives, from client device 150 via the one or more computer networks (e.g., computer network 14), connection information input via the user interface presented (or displayed) on a screen of client device 150.

At block 530, it is determined whether a test connection option (e.g., button) in the user interface is selected. If so, then, at block 540, HCA 120 attempts to connect to HKIS 160 using the connection information. For example, communication service 128 sends, to a host address that was input via the user interface, a test request including the API key, which was also input via the user interface. Results of the test connection may be presented on the user interface. Process 500 then proceeds to block 550.

If the test connection button was not selected, then process 500 proceeds to block 550. At block 550, which may or may not be performed in response to a selection of the test connection button, HCA 120 (e.g., application portal 122) stores the connection information to a memory. The memory may be volatile or non-volatile memory.

Examples

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is a computing system, the computing system including one or more processors, one or more storage media or memories coupled to the one or more processors and storing instructions which, when processed or executed by the one or more processors, cause: receiving, over one or more computer networks, from a health kiosk information system, healthcare data including at least a healthcare value that is obtained by one or more health kiosks that are managed by the health kiosk information system, the health kiosk information system being distinct from the computing system; reading, from a memory, notification rule data including a condition to be notified and a notification destination, the condition corresponding to the healthcare value; determining whether the healthcare value that is included in the healthcare data is applicable to the condition included in the notification rule data; and in response to determining that the healthcare value that is included in the healthcare data is applicable to the condition included in the notification rule data, sending, over the one or more computer networks, a notification to the notification destination that is indicated in the notification rule data.

A further clause is the computing system of the first clause where the instructions, when processed by the one or more processors, further cause sending, to the health kiosk information system, over the one or more computer networks, and using an application programing interface (API) of the health kiosk information system, a request to obtain the healthcare data, where receiving the healthcare data comprises receiving the healthcare data in response to the request.

A further clause is the computing system of the previous clause where the request includes connection information issued by the health kiosk information system.

A further clause is the computing system of the previous clause where the connection information is an API key.

A further clause is the computing system of the first clause where receiving the healthcare data is using an application programing interface (API) of the computing system.

A further clause is the computing system of the first clause where the instructions, when processed by the one or more processors, further cause generating the notification rule data based on a user operation on a client device that is connected to the computing system using the one or more computer networks.

A further clause is the computing system of the previous clause where the instructions, when processed by the one or more processors, further cause sending, over the one or more computer networks to the client device, a web content relating to a setting screen to receive the user operation.

A further clause is the computing system of the first clause where the healthcare value is related to a healthcare item that is managed by the health kiosk information system.

A further clause is the computing system of the previous clause where the healthcare item includes a body temperature and the healthcare value received from the health kiosk information system includes a body temperature value for a human.

A further clause is the computing system of the previous clause where the condition includes a threshold body temperature and determining whether the healthcare value included in the healthcare data is applicable to the condition included in the notification rule data comprises determining whether the body temperature value for the human is higher than the threshold body temperature.

A further clause is the computing system of a previous clause where the healthcare item includes at least face mask detection, the healthcare value received from the health kiosk information system includes a value of face mask detection for a human, and determining whether the healthcare value included in the healthcare data is applicable to the condition included in the notification rule data comprises determining whether the value of face mask detection for the human indicates no face mask.

A further clause is the computing system of the first clause where the healthcare value received from the health kiosk information system is for a human, the notification destination included in the notification rule data is set by a person; and the healthcare value is of the human.

A second clause is a method comprising: receiving, over one or more computer networks, from a health kiosk information system, healthcare data including at least a healthcare value that is obtained by one or more health kiosks that are managed by the health kiosk information system, the health kiosk information system being distinct from the computing system; reading, from a memory, notification rule data including a condition to be notified and a notification destination, the condition corresponding to the healthcare value; determining whether the healthcare value that is included in the healthcare data is applicable to the condition included in the notification rule data; and in response to determining that the healthcare value that is included in the healthcare data is applicable to the condition included in the notification rule data, sending, over the one or more computer networks, a notification to the notification destination that is indicated in the notification rule data.

A further clause is the method of the second clause, further comprising sending, to the health kiosk information system, over the one or more computer networks, and using an application programing interface (API) of the health kiosk information system, a request to obtain the healthcare data, where receiving the healthcare data comprises receiving the healthcare data in response to the request.

A further clause is the method of the previous clause where the request includes connection information issued by the health kiosk information system.

A further clause is the method of the previous clause where the connection information is an API key.

A further clause is the method of the second clause where receiving the healthcare data is using an application programing interface (API) of the computing system.

A further clause is the method of the second clause, further comprising generating the notification rule data based on a user operation on a client device that is connected to the computing system using the one or more computer networks.

A further clause is the method of the previous clause, further comprising sending, over the one or more computer networks to the client device, a web content relating to a setting screen to receive the user operation.

A further clause is the method of the second clause where the healthcare value is related to a healthcare item that is managed by the health kiosk information system.

A further clause is the method of the previous clause where the healthcare item includes a body temperature and the healthcare value received from the health kiosk information system includes a body temperature value for a human.

A further clause is the method of the previous clause where the condition includes a threshold body temperature and determining whether the healthcare value included in the healthcare data is applicable to the condition included in the notification rule data comprises determining whether the body temperature value for the human is higher than the threshold body temperature.

A further clause is the method of a previous clause where the healthcare item includes at least face mask detection, the healthcare value received from the health kiosk information system includes a value of face mask detection for a human, and determining whether the healthcare value included in the healthcare data is applicable to the condition included in the notification rule data comprises determining whether the value of face mask detection for the human indicates no face mask.

A further clause is the method of the second clause where the healthcare value received from the health kiosk information system is for a human, the notification destination included in the notification rule data is set by a person; and the healthcare value is of the human.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
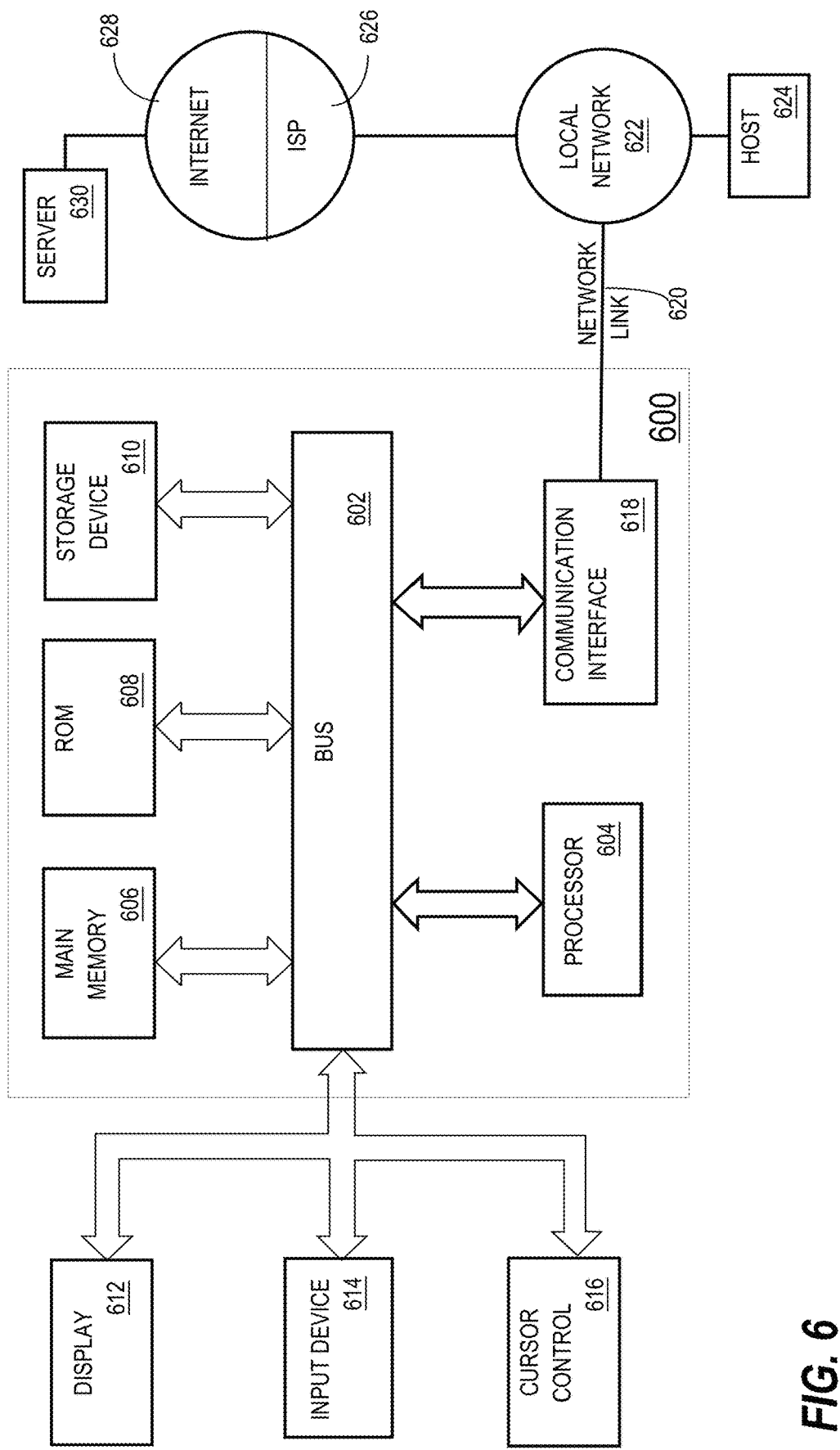
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computing system comprising:
   one or more processors; and
   one or more memories communicatively coupled to the one or more processors, the one or more memories storing instructions which, when processed by the one or more processors, cause:
   storing, in a memory, a plurality of notification rules, each notification rule including a condition to be notified and a notification destination;
   receiving condition input and an indication of a specific kiosk based on a user operation on a client device that is connected to the computing system using one or more computer networks, the condition input including condition information corresponding to a healthcare value and including a corresponding notification destination;
   generating a particular notification rule based on the condition input, the particular notification rule including the condition information, including an identifier of the specific kiosk, and including the corresponding notifications destination;
   storing the particular notification rule in the memory;
   receiving, over the one or more computer networks, from a health kiosk information system, healthcare data including at least the healthcare value that is obtained by one or more health kiosks that are managed by the health kiosk information system, the health kiosk information system being distinct from the computing system;
   reading, from the memory, the particular notification rule triggered based on receiving the healthcare data, the particular notification rule including a condition to be notified and the corresponding notification destination, the condition corresponding to the healthcare value;
   ascertaining whether the healthcare data is received from the specific kiosk;
   determining whether the healthcare value that is included in the healthcare data is applicable to the condition included in the particular notification rule;
   in response to determining that the healthcare value that is included in the healthcare data is applicable to the condition included in the particular notification rule, identifying a particular notification destination indicated in the particular notification rule; and in response to identifying the particular notification destination, sending, over the one or more computer networks, only when the healthcare data is received from the specific kiosk, a notification to the particular notification destination that is indicated in the particular notification rule.

2. The computing system of claim 1, wherein the instructions, when processed by the one or more processors, further cause:

sending, to the health kiosk information system, over the one or more computer networks, and using an application programing interface (API) of the health kiosk information system, a request to obtain the healthcare data, wherein receiving the healthcare data comprises receiving the healthcare data in response to the request.

3. The computing system of claim 2, wherein the request includes connection information issued by the health kiosk information system.

4. The computing system of claim 3, wherein the connection information is an API key.

5. The computing system of claim 1, wherein receiving the healthcare data is using an application programing interface (API) of the computing system.

6. The computing system of claim 1 wherein the instructions, when processed by the one or more processors, further cause:

sending, over the one or more computer networks to the client device, a web content relating to a setting screen to receive the user operation.

7. The computing system of claim 1, wherein the healthcare value is related to a healthcare item that is managed by the health kiosk information system.

8. The computing system of claim 7, wherein:

the healthcare item includes a body temperature; and the healthcare value received from the health kiosk information system includes a body temperature value for a human.

9. The computing system of claim 8, wherein:

the condition includes a threshold body temperature; and determining whether the healthcare value included in the healthcare data is applicable to the condition included in the particular notification rule comprises determining whether the body temperature value for the human is higher than the threshold body temperature.

10. The computing system of claim 7, wherein:

the healthcare item includes at least face mask detection;

the healthcare value received from the health kiosk information system includes a value of face mask detection for a human; and determining whether the healthcare value included in the healthcare data is applicable to the condition included in the particular notification rule comprises determining whether the value of face mask detection for the human indicates no face mask.

11. The computing system of claim 1, wherein:

the healthcare value received from the health kiosk information system is for a human; and the notification destination included in the notification rule is set by a person.

12. A method comprising:

storing, in a memory, a plurality of notification rules, each notification rule including a condition to be notified and a notification destination;

receiving condition input and an indication of a specific kiosk based on a user operation on a client device that is connected to a computing system using one or more computer networks, the condition input including condition information corresponding to a healthcare value and including a corresponding notification destination;

generating a particular notification rule based on the condition input, the particular notification rule including the condition formation, including an identifier of the specific kiosk, and including the corresponding notification destination;

storing the particular notification rule in the memory;

receiving, over the one or more computer networks, from a health kiosk information system, healthcare data including at least the healthcare value that is obtained by one or more health kiosks that are managed by the health kiosk information system, the health kiosk information system being distinct from an entity that performs the method;

reading, from the memory, the particular notification rule triggered based on receiving the healthcare data, the particular notification rule including a condition to be notified and the corresponding notification destination, the condition corresponding to the healthcare value;

ascertaining whether the healthcare data is received from the specific kiosk;

determining whether the healthcare value that is included in the healthcare data is applicable to the condition included in the particular notification rule;

in response to determining that the healthcare value that is included in the healthcare data is applicable to the condition included in the particular notification rule, identifying a particular notification destination indicated in the particular notification rule; and in response to identifying the particular notification destination, sending, over the one or more computer networks, only when the healthcare data is received from the specific kiosk, a notification to the particular notification destination that is indicated in the particular notification rule.

13. The method of claim 12, further comprising:

sending, to the health kiosk information system, over the one or more computer networks, and using an application programing interface (API) of the health kiosk information system, a request to obtain the healthcare data, wherein receiving the healthcare data comprises receiving the healthcare data in response to the request.

14. The method of claim 12, wherein receiving the healthcare data is using an application programing interface (API) of the entity that performs the method.

15. The method of claim 12, further comprising:

receiving condition input based on a user operation on a client device that is connected to the entity that performs the method using the one or more computer networks, the condition input including condition information corresponding to a healthcare value and including a corresponding notification destination;

generating a generated notification rule based on the condition input, the generated notification rule including the condition information and including the corresponding notification destination; and storing the generated notification rule in the memory.

16. The method of claim 12, wherein the healthcare value is related to a healthcare item that is managed by the health kiosk information system.

17. One or more storage media storing instructions which, when executed by one or more processors, cause:
- storing, in a memory, a plurality of notification rules, each notification rule including a condition to be notified and a notification destination;
- receiving condition input and an indication of a specific kiosk based on a user operation on a client device that is connected to a computing system using one or more computer networks, the condition input including condition information corresponding to a healthcare value and including a corresponding notification destination;
- generating a particular notification rule based on the condition input, the particular notification rule including the condition information, including an identifier of the specific kiosk, and including the corresponding notification destination;
- storing the particular notification rule in the memory;
- receiving, over the one or more computer networks, from a health kiosk information system, healthcare data including at least the healthcare value that is obtained by one or more health kiosks that are managed by the health kiosk information system;
- reading, from the memory, the particular notification rule triggered based on receiving the healthcare data, the particular notification rule including a condition to be notified and the corresponding notification destination, the condition corresponding to the healthcare value;
- ascertaining whether the healthcare data is received from the specific kiosk;
- determining whether the healthcare value that is included in the healthcare data is applicable to the condition included in the particular notification rule;
- in response to determining that the healthcare value that is included in the healthcare data is applicable to the condition included in the particular notification rule, identifying a particular notification destination indicated in the particular notification rule; and
- in response to identifying the particular notification destination, sending, over the one or more computer networks, only when the healthcare data is received from the specific kiosk, a notification to the particular notification destination that is indicated in the particular notification rule.

18. The computing system of claim 1,
wherein a first condition of a first notification rule is different from a second condition of a second notification rule, and
wherein a notification destination of the first notification rule is different from a notification destination of the second notification rule.

19. The computing system of claim 1,
wherein the healthcare data comprises an instance of healthcare data including a plurality of healthcare values,
wherein reading comprises reading, from the memory, a plurality of notification rules, each of the plurality of notification rules including a condition to be notified and a corresponding notification destination, each condition corresponding to a healthcare value of the plurality of healthcare values, and
wherein sending comprises sending a plurality of notifications, each of the plurality of notifications sent to a corresponding notification destination indicated in a corresponding notification rule.

20. The computing system of claim 1, where the notification includes a link to modify the particular notification rule that was triggered based on receiving the healthcare data.

* * * * *